April 23, 1935.  R. J. BROEGE  1,998,978
INTERNAL COMBUSTION ENGINE
Filed Feb. 24, 1931   2 Sheets-Sheet 1
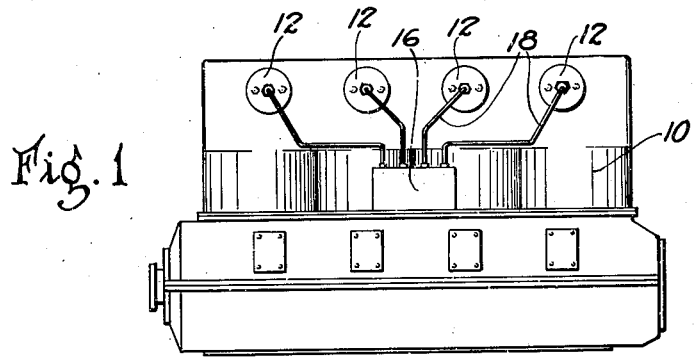
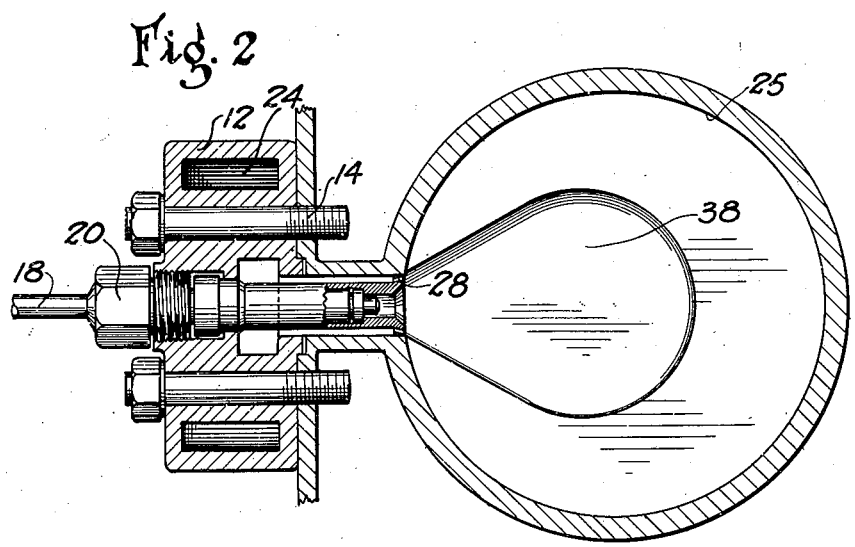
INVENTOR.
Robert J. Broege
BY Warren T. Hunt
ATTORNEY

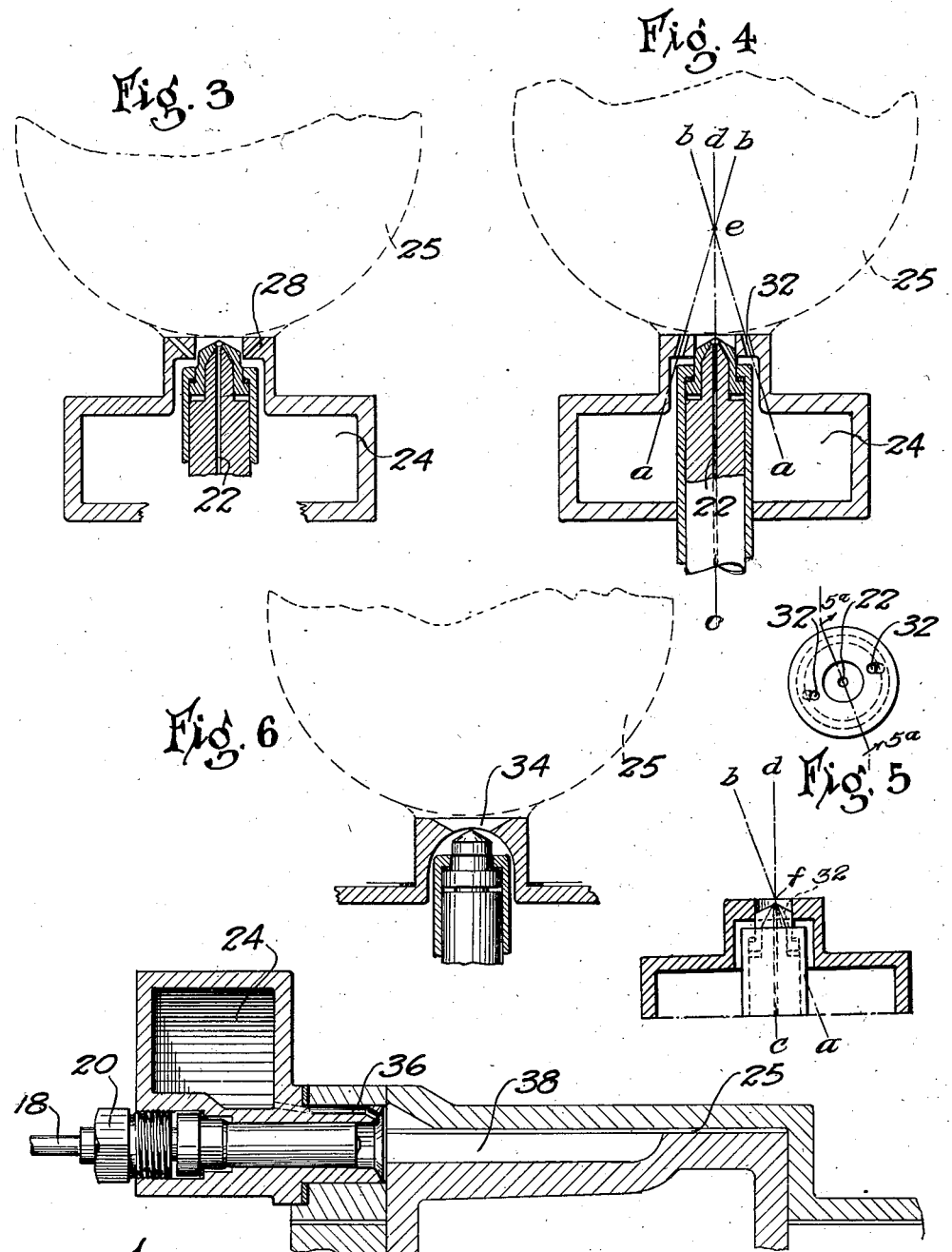

Patented Apr. 23, 1935

1,998,978

UNITED STATES PATENT OFFICE 1,998,978

INTERNAL COMBUSTION ENGINE

Robert J. Broege, Harvey, Ill., assignor to International Engineering Corporation, Chicago, Ill., a corporation of Illinois Application February 24, 1931, Serial No. 517,652

1 Claim. (Cl. 123—32)

This invention relates to internal combustion engines and particularly to a means for introducing a quantity of air to a partially burned mixture in a manner to produce turbulence during the combustion stroke. The invention is illustrated as embodied in an engine of the conventional four cycle type but it is also adaptable to a two cycle engine.

One of the objects of the invention is to promote better combustion of the fuel mixture and this is accomplished in one desirable embodiment by dividing the total clearance space of the engine into two interconnected chambers. The space above the piston constitutes the main combustion chamber and the other space forms an auxiliary air chamber which discharges its contents of previously compressed air into the combustion chamber after the gas has expanded to a point where the pressure is lower than that existing in the auxiliary chamber.

A feature of the invention relates to the arrangement of air passages from the auxiliary chamber which are preferably arranged to introduce the air in divergent or non-impinging stream lines.

Other objects and features of the invention will appear from the following description in connection with which I have illustrated certain desirable embodiments of the invention in the accompanying drawings in which:

Figure 1 is a side elevation of an engine with the improved fuel and air control unit installed thereon;

Figure 2 is a plan view partly in section of an engine cylinder and the improved combustion control unit;

Figure 3 is a sectional plan view of a modified form of the invention;

Figure 4 is a section of a modified form;

Figure 5 is an end view of the form shown in Figure 4;

Fig. 5a is a section on the line 5a—5a of Fig. 5.

Figure 6 is another modified form of the invention; and

Figure 7 is a vertical section of an engine cylinder showing still another modification.

Referring to the drawings, 10 is an engine having four cylinders, each of which is fed by a fuel nozzle 12, one of which is installed in each of the cylinders. Fuel nozzles 12 are preferably detachable from the engine cylinder and are secured thereto by bolts 14. The engine is fed from pump 16 through pipes 18 each of which is secured to its corresponding nozzle by fitting 20 and the fuel is delivered into the cylinder through a metering passage 22. Surrounding the nozzle is an air chamber 24 that is in communication with the cylinder 25 through divergent restricted passages 28. Space 24 is preferably in excess of 15% of the combined volume of the compression space in cylinder 25 and the space 24. I prefer that space 24 shall be in excess of 50% of the combined volume but satisfactory results have been secured with as low as the 15% heretofore mentioned.

Referring to Figs. 4, 5 and 5a, I have shown therein a modified arrangement in which the air passages 32 produce a converging vertical swirl around the nozzle. As shown in Fig. 5, the extended projection $a\,b$ of the axis of each passage 32 upon a horizontal plane containing the axis $c\,d$ of the fuel jet converges upon said axis $c\,d$ and meets it at a point $e$ inside the cylinder. Thus the motion of the air emerging from the passages 32 will have a component toward the axis $c\,d$. In order also to produce a swirling action, the air passages are directed slightly askew, as shown in Figs. 5 and 5a. As shown in Fig. 5a, the projection of the axis $a\,b$ of each passage 32 upon the plane 5a—5a (Fig. 5) is at an angle with respect to the axis $c\,d$ of the fuel jet, and intersects this axis at the point $f$. This insures that the motion of the air emerging from the passages 32 will have a component of angular momentum with respect to the nozzle, and will produce a swirling motion, in addition to the converging motion, of the charge within the cylinder.

In Figure 6, I have shown the air passages in the form of a diverging slot 34, and in Figure 7, I have shown the chamber 24 located on the upper side of the nozzle and communicating with the cylinder through a single passage 36.

In the operation of the engine air will be drawn into the cylinder in the usual manner and compressed to a predetermined pressure. During the compression stroke the air will pass into the chamber 24 through the restricted passages 28, 32, 34, or 36 and the pressure within the chamber 24 will be substantially equal to that existing in the combustion chamber 38. Fuel will be injected into the combustion chamber at approximately the top of the compression stroke and combustion will result from the heat of compression. The compression chamber 38 does not contain a sufficient amount of compressed air to completely consume all of the fuel charge and additional air is needed to produce complete combustion which is supplied from the auxiliary chamber. The additional air that is entrapped in chamber 24 will not be introduced into the combustion chamber until the pressure therein is less than that existing in chamber 24. In ordinary engines this will occur at approximately one-half the piston travel and from there on the air within the chamber 24 will be injected into the combustion chamber in a sufficient quantity to burn the entire charge. The volume of chamber 24 is preferably greater than fifty percent of the total volume of the two chambers and therefore a substantial quantity of air is induced in diverging streams to thoroughly agitate the partially burned charge and bring each particle of fuel into intimate contact with the charge of turbulent air. I prefer at all times to construct chamber 24 with a capacity of at least fifteen percent of the total clearance volume and have secured more satisfactory results by increasing the size of chamber 24 to fifty percent or more of the total volume. Care must be used to construct the combustion chamber 38 of sufficient size to institute initial combustion but the percentages above given are suitable for the purpose.

Although I have illustrated and described certain embodiments of the invention, it is understood that this showing and description are illustrative only and that I do not regard the invention as limited to the forms shown and described or otherwise except by the terms of the following claim.

I claim:

A Diesel engine comprising a cylinder having a combustion chamber, a device secured to the side of the cylinder and formed with a central opening extending through said device and through a side wall of said cylinder, said device providing an auxiliary chamber adjacent said opening having a volume in excess of thirty-five percent of the combined volume of both chambers, a fuel injection nozzle arranged demountably in and substantially filling said opening and closing said auxiliary chamber off from the atmosphere and having an outlet arranged to inject fuel directly into said combustion chamber through the opening in said cylinder wall, and a plurality of restricted passages surrounding the fuel injection nozzle and connecting the auxiliary chamber and the cylinder, each individual passage being so directed that the extended projection of the axis of said passage upon a plane containing the axis of the fuel injection nozzle and the point at which said axis of the passage enters the cylinder will intersect the extended axis of the fuel injection nozzle at a point within the cylinder; and the projection of said axis of the passage upon a second plane, also containing the axis of the fuel injection nozzle and perpendicular to the first plane, will intersect said extended axis of the fuel injection nozzle at the point at which said axis of the fuel injection nozzle enters the cylinder and at an angle thereto, whereby air passing through said air passages from said auxiliary chamber into said combustion chamber will have a converging whirling motion adjacent said outlet and create a turbulent mixture within said combustion chamber.

ROBERT J. BROEGE.